United States Patent
Darley

[15] 3,640,343
[45] Feb. 8, 1972

[54] STABILIZATION OF HARD SHALY FORMATIONS WITH ALKALI METAL SILICATE

[72] Inventor: Henry C. H. Darley, Houston, Tex.
[73] Assignee: Shell Oil Company, New York, N.Y.
[22] Filed: May 20, 1970
[21] Appl. No.: 39,676

[52] U.S. Cl. ..........................166/292, 166/305 R, 252/8.5 B
[51] Int. Cl. ..................................E21b 21/04, E21b 33/138
[58] Field of Search..............175/65.72; 252/8.5 B; 166/292, 166/305 R; 61/36 R

[56] References Cited

UNITED STATES PATENTS

| | | | |
|---|---|---|---|
| 2,131,338 | 9/1938 | Vail | 166/292 |
| 2,146,693 | 2/1939 | Vietti et al. | 252/8.5 B |
| 2,353,230 | 7/1944 | Garrison et al. | 252/8.5 B |
| 3,168,139 | 2/1965 | Kennedy et al. | 166/292 |
| 3,259,189 | 7/1966 | Darley | 166/292 |
| 3,375,872 | 4/1968 | McLaughlin et al. | 166/292 |

*Primary Examiner*—Ian A. Calvert
*Attorney*—George G. Pritzker and Harold L. Denkler

[57] ABSTRACT

An improved method for stabilizing hard shaly earth formations comprising treatment of said formations with a low viscosity fluid consisting of an aqueous liquid containing a minor amount of a water-soluble alkali metal silicate having a pH in the range of from about 11 to about 12 and preferably between about 11.1 and 11.4.

10 Claims, 2 Drawing Figures

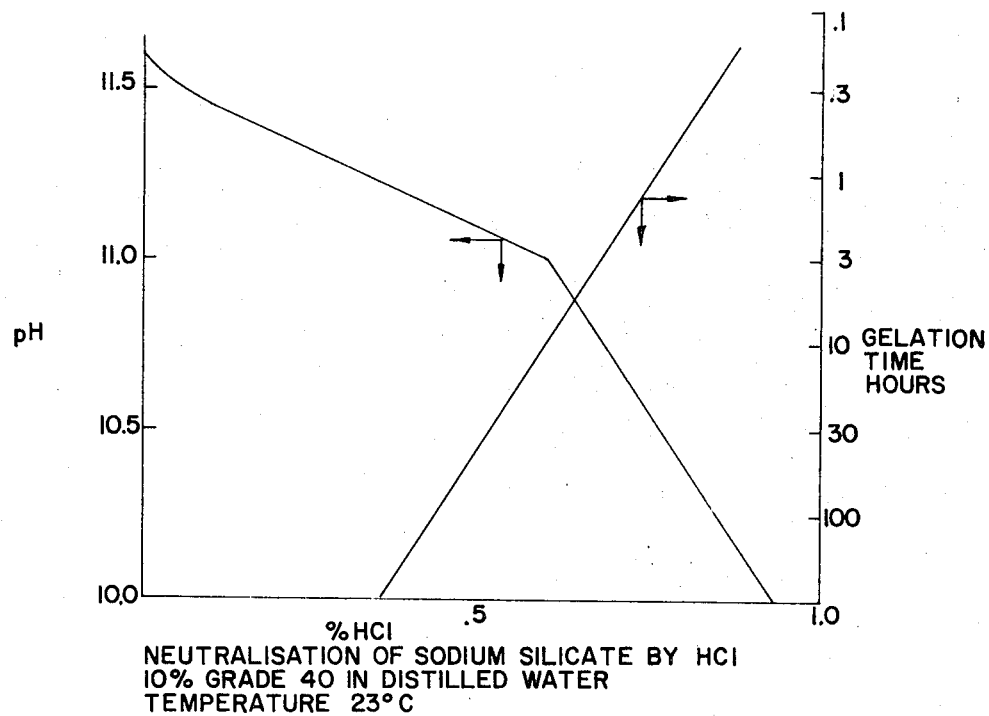
FIG. 1 — NEUTRALISATION OF SODIUM SILICATE BY HCl
10% GRADE 40 IN DISTILLED WATER
TEMPERATURE 23°C
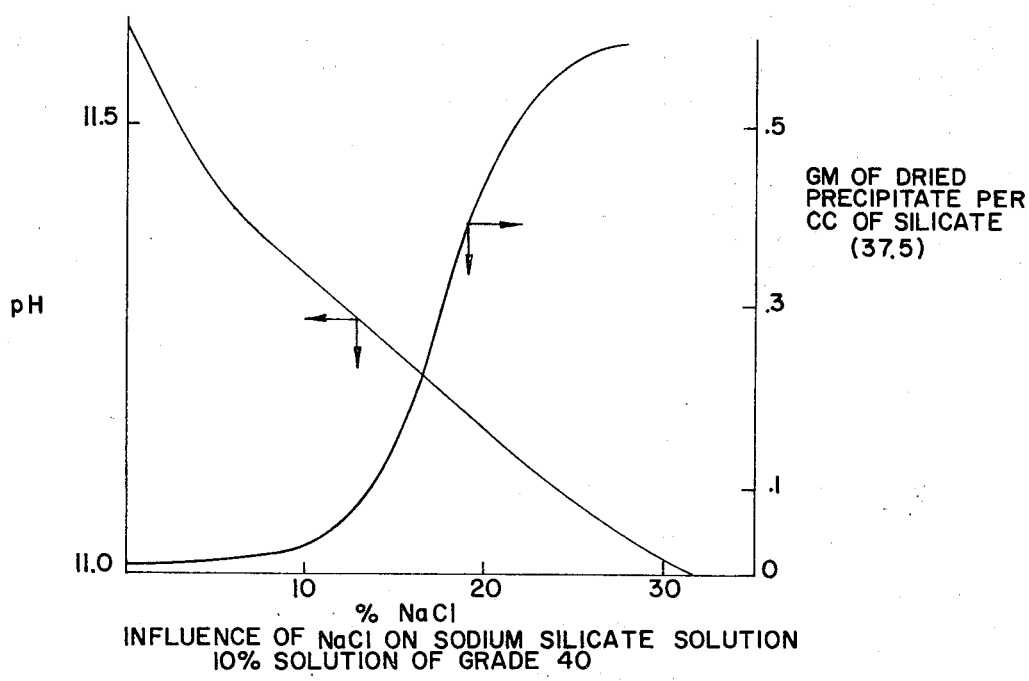
FIG. 2 — INFLUENCE OF NaCl ON SODIUM SILICATE SOLUTION
10% SOLUTION OF GRADE 40
INVENTOR:
H. C. H. DARLEY

STABILIZATION OF HARD SHALY FORMATIONS WITH ALKALI METAL SILICATE

The present invention is directed to an improved fluid for reducing the water sensitivity of hard shaly earth formations by penetrating into water-penetrable interstices of said earth formations and coating their walls with siliceous materials capable of preventing collapsing, caving, sloughing, etc., said shale-treating fluid comprising an aqueous solution containing from about 1 percent and up to about 20 percent by weight of dissolved alkali metal silicate (preferably containing from about 2 percent to about 6 percent by weight of dissolved $SiO_2$) said solution having a viscosity of less than about 2 centipoise (cp.) and preferably less than 1.5 cp. and said solution having a pH within the range of 11–12 and preferably 11.1–11.4. Shale-treating fluids of the present invention when forced into hard shaly earth formations at a pressure exceeding the fluid pressure within the earth formations can penetrate sufficiently deeply into the earth formations to coat and consolidate said formations with siliceous material. Such fluids can advantageously be used as drilling and/or treating fluid in boreholes in which such shales are encountered.

STATE OF THE ART

The present invention is particularly useful in treating hard, or consolidated, or midcontinent, shales such as Anahuac, Wapiabi, Atoka, etc. The term "shale" is used (as is common in drilling logs, etc.), to refer to shaly earth formation, ranging from logs which are highly reactive with water to completely lithified material, such as claystones and slates, that are inert to water. The pressure treatments reduce the tendency of such hard shales to create borehole instability problems due to heaving, sloughing, caving, shaletight hole or hole enlargement or the like. The hard shales are particularly susceptible to causing borehole instability when they are highly stressed and/or permeated with fractures that may or may not have healed or become rebonded. Such hard shales may collapse in the absence of water, undergoing dry sloughing, or may collapse in the presence of water. The hard shales are, however, less susceptible to water damage than the strongly swelling soft bentonitic or Gulf Coast shales. Such soft shales interact with water to first swell and then become soft and gooey and finally to form a mud.

Shaly earth formations have been incidentally contacted with relatively very dilute aqueous solutions containing the minor amounts of alkali metal silicate needed to precipitate calcium or magnesium ions from an aqueous drilling mud and/or a softened field of water. Such very dilute solutions have little or no effect on the stability of the shaly earth formations.

In drilling into water-sensitive strongly swelling, soft shaly earth formations, such as bentonitic or Gulf Coast soft shales, it has been proposed as evident from U.S. Pat. Nos. 2,146,693; 2,165,823 and 2,165,824, to use aqueous drilling muds containing relatively large proportions of dispersed solids and dissolved sodium silicate. Such low filter loss silicate-containing muds are generally recommended, contain concentrations of the aqueous 50 Be' sodium silicate $Na_2O:SiO_2$ ratio 1:2, pH 12.5 from about 25 to 90 percent by volume and generally between 30 and 70 percent by volume and 70–30 percent saturated salt. In such muds, the combination of the suspended clay particles that provide a filter loss control and the solid particles that become stably suspended during a drilling operation form very viscous muds which are difficult to handle and work with and the ability of such viscous muds to penetrate into the formation are greatly reduced.

In air drilling operations, water-sensitive shaly earth formations have been contacted with aqueous silicates to seal off water-producing formations. For example, in air drilling operations, as described in U.S. Pat. No. 3,259,189, water-sensitive shaly earth formations are contacted with concentrated aqueous silicate solutions to coat the shaly portions of the borehole wall and keep them from collapsing when they are contacted by water. In aqueous solution, the silicate or waterglass concentration is about 90 percent by volume and the shaly earth formations are simply wetted with such solutions and are removed before any significant penetration occurs.

SUMMARY OF THE INVENTION

It has now been discovered that hard shaly earth formations can be stabilized and caving, collapsing, sloughing, etc., during drilling or fluid production prevented by:

a. preparing a dilute (5–20 percent) aqueous solution of alkali metal silicate containing from about 2 to about 6 percent by weight of $SiO_2$ and having a viscosity of less than 2 centipoise (cp.) and a pH of from about 11 to about 12; and, b. injecting solution (a) into a hard shaly earth formation by maintaining a pressure on the solution that exceeds the fluid pressure within the earth formation and maintaining said pressure until the solution penetrates into at least the exposed surfaces of the earth formation.

Essentially, the present invention is based on the discovery that maintaining silicate solutions of the present invention at a low viscosity of less than 2 cp., preferably less than 1 cp., as distinguished from about 6 cp. or more, as practiced by the prior art and maintaining the solution pH at a pH of 11–12, and forcing or injecting the solution under pressure so as to penetrate at least into the exposed surface of the earth formation, provides advantages in the efficiency of the treatment and stabilization of the formation. In a preferred procedure, the pH is adjusted to a value between 11.1 and 11.4 such that the dilute solution of the present invention readily and effectively deposits siliceous material on any clay solids that it contacts, and this provides stability that exceeds more concentrated solutions as described in the above-cited patented art. In addition, in a drilling operation, the use of the relatively high filter loss dilute solution (5–15 percent silicate) avoids the problem of having the drilling fluid viscosity increase due to the entrainment of earth formation solids that cannot readily be removed by settling, or the like, procedures. It provides the advantage of fast drilling through hard brittle shales that would tend to slough and cave if they were to be drilled with clear water.

In the preparation of the aqueous solutions of silicate of the present invention, the low viscosity, controlled pH and the tendency to promptly deposit siliceous material on clay solids are the essential factors to the success of these solutions and the method in which they are injected into the formation; namely, under controlled pressure. Aqueous alkali metal silicate, e.g., sodium silicate solutions containing 2–6 percent $SiO_2$ and optionally from about 10 to about 20 percent alkali metal halide, e.g., sodium chloride are particularly preferred.

The injection of a dilute aqueous silicate solution relatively deeply into the shaly earth formations is a particularly distinctive feature of the present invention and contrary to the above-cited patent art. The deep penetration necessitates spotting the aqueous silicate against the formation and applying a pressure differential of several hundred pounds in excess of the formation fluid pressure. In some cases the density of the aqueous silicate can be high enough so that the injection can be accomplished by the hydrostatic pressurization of a column of fluids standing in the borehole. In other cases, the hydrostatic pressure should be supplemented by a pump pressure.

DESCRIPTION OF THE DRAWING

FIG. 1 illustrates a plot of the pH and gel time with percent of acid added to a solution of sodium silicate.

FIG. 2 illustrates a plot of pH and amount precipitated with percent of sodium chloride added to a solution of sodium silicate.

PREFERRED EMBODIMENT OF THE INVENTION

The additions of salts and acids to dilute alkali silicate (sodium silicate) solutions of the present invention to stabilize shale has been investigated and can be practiced effectively. It is well known that acidification of sodium silicate solutions will cause the silica anions to aggregate and eventually gel. The rate of gelation depends on the pH, the temperature and the presence of other electrolytes. (Soluble Silicates, Vol. 1, J. G. Vail, Rheinhold, N.Y., pp. 158–173). In a series of tests FIG. 1 shows the change in pH and gelation time when a 10 percent solution of Diamond Alkali Grade 40 silicate ($Na_4O:SiO_2$ ration 1:3.22) was neutralized with HCl and it can be seen that the gel time decreased logarithmically with increase in HCl. In another series of tests, HCl-$Na_2SiO_3$ solutions covering the same pH range were injected into shale specimens in the triaxial shale tester described on page 10. Examples 1–5 in Table 1, show the results obtained. It can be seen that maximum stability was obtained within a critical pH range (11.25 to 11.1). Reference to FIG. 1 shows that the minimum gel time in this pH range was 50 hours, and therefore, the solution is expected to gel during the injection period which takes about 18 hours.

The precipitation of silica from mixtures of NaCl and $Na_2SiO_3$ can be inhibited or accelerated by the addition of NaOH or HCl, respectively. Tests with two mixtures, 10 percent silicate in 15 percent NaCl and 10 percent silicate in saturated NaCl, showed peak shale stability when the pH was adjusted to 11.25 (note Examples 12–21, Table 1).

Tests were also made with Grade 50 sodium silicate ($Na_2O:SiO_2$ ratio 1:2). This grade contains about the same concentration of silica but is more alkaline than Grade 40. A 10 percent solution in distilled water was found to be less effective in stabilizing shale than a similar solution of Grade 40. However, when the pH was adjusted with NaCl or HCl stabilities were similar to those obtained with Grade 40 at similar pH (Examples 23–25, Table 1).

The test results show that sodium silicate solutions of the present invention have maximum stabilizing effects when the pH is such that the silica is in a state of incipient aggregation. In the system $Na_2SiO_3$ and NaCl, the critical pH range will be the same irrespective of the ratio of NaCl to $Na_2SiO_3$ or the

TABLE 1.—EFFECT OF SODIUM SILICATE ON HOLE STABILITY [1]

| | Percent silicate | Percent brine | Percent NaCl in brine | Other additives | pH | Cc. injected | Spalling pt., p.s.i. | Stress to 20% strain |
|---|---|---|---|---|---|---|---|---|
| Tests with diamond alkali grade 40 sodium silicate | | | | | | | | |
| 1 | 10 | 90 | 0 | 0 | 11.62 | 12.7 | 2,700 | 3,200 |
| 2 | 10 | 90 | 0 | .2% HCl | 11.35 | 16.9 | 3,800 | 4,300 |
| 3 | 10 | 90 | 0 | .3% HCl | 11.25 | 11.5 | 4,700 | 4,950 |
| 4 | 10 | 90 | 0 | .5% HCl | 11.1 | 19.5 | 4,700 | 5,500 |
| 5 | 10 | 90 | 0 | .6% HCl | 11.0 | 24, 24 | 2,800, 2,800 | [2] 5,400, 3,650 |
| 6 | 10 | 90 | 3 | | 11.5 | 14.9 | 2,800 | 4,000 |
| 7 | 10 | 90 | 6 | | 11.4 | ? | 2,850 | 3,850 |
| 8 | 10 | 90 | 10 | | 11.33 | 15.4 | 2,800 | 3,950 |
| 9 | 10 | 90 | 12 | | 11.29 | 13.7 | 2,900 | 3,600 |
| 10 | 10 | 90 | 15 | | 11.25 | 22, 23 | 4,900, 4,700 | [2] 5,400, 5,300 |
| 11 | 10 | 90 | Sat. | | 11.0 | 30 | 2,600 | 3,400 |
| 12 | 10 | 90 | 15 | .5% NaOH | 11.6 | 18 | 2,900 | 3,750 |
| 13 | 10 | 90 | 15 | .2% NaOH | 11.4 | 15.5 | 4,200 | 4,800 |
| 14 | 10 | 90 | 15 | .1% NaOH | 11.3 | 15 | 3,900 | 4,700 |
| 15 | 10 | 90 | 15 | .1% HCl | 11.1 | 23.8 | 4,500 | 5,000 |
| 16 | 10 | 90 | 15 | .2% HCl | 11.0 | 33 | 4,300 | 4,650 |
| 17 | 10 | 90 | Sat. | 1.2% NaOH | 12.0 | 21.4 | 2,600 | 3,200 |
| 18 | 10 | 90 | Sat. | .81% NaOH | 11.7 | 13 | 2,700 | 3,350 |
| 19 | 10 | 90 | Sat. | .6% NaOH | 11.55 | 12.5 | 2,800 | 3,500 |
| 20 | 10 | 90 | Sat. | .4% NaOH | 11.4 | 15.4 | 2,900 | 3,350 |
| 21 | 10 | 90 | Sat. | .3% NaOH | 11.3 | 12.7 | 4,200 | 5,000 |
| Tests with diamond alkali grade 50 sodium silicate | | | | | | | | |
| 23 | 10 | 90 | 0 | | 12.35 | 12.7 | 2,200 | 2,530 |
| 24 | 10 | 90 | 0 | 1% HCl | 11.25 | 13.7 | 5,100 | 5,500 |
| 25 | 10 | 90 | Sat. | | 11.55 | 12.1 | 2,800 | 3,150 |

[1] Mitchell shale specimens reconstituted in distilled water. ½" hole drilled under 1000 p.s.i. uniform triaxial stress. Silicate solutions injected at 500 p.s.i. for 18 hours. Fluid pressure reduced to 0. Stress raised triaxially in steps of 100 p.s.i. over 2 min.
[2] Duplicate tests.

Addition of NaCl to a 10 percent solution of Grade 40 silicate was found to lower the pH and aggregation of the silica occurred in the same pH range as in the silicate-HCl series. However, with the NaCl the silica was precipitated as a gelatinous floc rather than as a continuous gel structure, the amount of the floc increased with increase in the amount of NaCl added (see FIG. 2) but in all cases was precipitated as soon as the NaCl was added. When these solutions (less than floc) were injected into the shale specimens, peak stability was again obtained at pH 11.25 (note Examples 6–11 Table 1).

$Na_2O$-$SiO_2$ ratio of the silicate used. The critical range may, however, be expected to vary with the concentration of silicate and the temperature.

Additional tests were carried out in the triaxial shale tester under simulated earth stresses and the results are shown in Table 2. The optimum injection volume for specimens of the present invention, which have a pore volume of 1.5 cc. (based on movable water), appeared to be 12–15 cc. The stability of the specimen was also found to depend on the salinity of the pore water and of the brine used to dilute the sodium silicate.

TABLE 2.—EFFECT OF SODIUM SILICATE ON HOLE STABILITY [1]

| | Specimen compacted in— | Treating solution | | | Cc. injected in 20 hrs. | Spalling pt., p.s.i. | Stress to 20% strain, p.s.i. | Remarks |
|---|---|---|---|---|---|---|---|---|
| | | Percent sodium silicate | Percent brine | Percent NaCl brine | | | | |
| 1 | 3% NaCl | 90 | 10 | 30 | 2.7 | 2,700 | 5,000 | Solution visc. 56 cp. |
| 2 | 3% NaCl | 50 | 50 | 6 | 4.3 | 2,600 | 3,200 | Solution visc. 6 cp. |
| 3 | 3% NaCl | 20 | 80 | 6 | 11.8 | 3,300 | 4,400 | Solution visc. 1 cp. |
| 4 | 3% NaCl | 10 | 90 | 6 | 36 | 3,000 | >4,000 | Solution visc. <1 cp. |
| 5 | 3% NaCl | 10 | 90 | 6 | 13.9 | 2,900 | 4,400 | Injected in 250 mins. |
| 6 | Distilled water | 10 | 90 | 6 | ? | 2,850 | 3,850 | |
| 7 | do | 10 | 90 | 6 | 12.6 | 3,750 | 4,350 | Shale converted to Na form. |
| 8 | do | 10 | 90 | (2) | 12.7 | 2,700 | 3,200 | |
| 9 | do | 10 | 90 | 15 | 23 | 4,700 | 5,300 | |
| Controls: | | | | | | | | |
| 10 | 3% NaCl | Borehole fluid 3% brine | | | | ~1,600 | 1,600 | No fluid injected. |
| 11 | 3% NaCl | Borehole fluid air | | | | 2,600 | 3,400 | Do. |

[1] Reconstituted Mitchell shale specimen. ½" hole drilled under 100 p.s.i. uniform triaxial stress. Silicate solution injected for 20 hours under 500 p.s.i. fluid pressure. Fluid pressure reduced to zero before making stability determination.
[2] Distilled water.

With regard to the latter, increase in concentration of NaCl increased the stability but with the particular type of sodium silicate used (Na₂O/SiO₂ ratio 1–3.22) the silicate starts to precipitate above a certain NaCl concentration. Two very favorable results (see Example 9, Table 2) were obtained when using brine concentrations somewhat above the precipitation point.

The results obtained with the silicate may be compared with when the borehole fluid was brine and air (see Examples 10 and 11, Table 2). It is evident that the silicate not merely prevents the weakening of the shale by the brine but actually increases its strength. That this stabilization was not due to precipitation of silica by polyvalent cations is shown by Example 7 in which the shale was first converted to the sodium form by leaching with NaCl and then leaching with distilled water before injecting the silicate solution. Evidently the stabilization is caused by the adsorption of silicate on the shale surfaces.

Test data showing the effect of concentration of the silicate solution on hole stability is gent in Table 3. For Grade 40 silicate, a 10 percent solution is about the optimum concentration if both efficiency and effectiveness are considered. The pH and time for gelation of several concentrations of Grade 40 silicate treated with HCl are shown in Table 4. It will be noted that pH at which the different concentrations have equal gel times decreases with concentration.

in that low silicate concentrations (for example, less than 20 percent) would be suitable.

3. As a batch treatment, perhaps to be spotted across troublesome shales during round trips. The mud column overbalance would provide the pressure differential tending to permeate the shale with the treating fluid.

TABLE 4.—pH AND GEL TIMES OF SEVERAL CONCENTRATIONS OF GRADE 40 SODIUM SILICATE WHEN TREATED WITH HCl

| Percent HCl added | 5% silicate solution | | 10% silicate solution | | 20% silicate solution | |
|---|---|---|---|---|---|---|
| | pH | Gel time, min. | pH | Gel time | pH | Gel time |
| 0 | 11.4 | | 11.6 | | 11.8 | |
| .1 | N.D. | N.D. | 11.45 | >3 days | | |
| .2 | 11.05 | N.D. | N.D. | N.D. | | |
| .3 | 10.7 | N.D. | 11.2 | >3 days | | |
| .5 | 9.2 | 60 | 11.1 | 2 days | 11.4 | >3 days. |
| .6 | 7.7 | 6 | 11.0 | 9 hours | N.D. | N.D. |
| .7 | | | 10.7 | 100 min. | 11.3 | 2 days. |
| 1.0 | | | 9.8 | 5 min. | 11.1 | 3 min. |

Note.—N.D.=Not determined.

BASIC TYPES OF SILICATE LOW-SOLIDS FLUIDS

As previously discussed, silicate systems may be prepared with either fresh or saline water. Each type has its particular TABLE 3.—INFLUENCE OF THE CONCENTRATION OF WATERGLASS ON STRENGTH OF SHALE SPECIMENS [1]

| Treating solution | | | | Hole stability | | |
|---|---|---|---|---|---|---|
| Percent Grade 40 | Percent NaCl in brine | Other ingredients | Injection rate, cc./hour | Spalling point, p.s.i. | P.s.i. to 20% strain | Remarks |
| 10 | 6 | | *3.4 | 2,900 | 4,400 | Solution viscosity. <1 cp. |
| 20 | 6 | | *1.0 | 3,150 | 4,250 | Solution viscosity. 1 cp. |
| 50 | 6 | | *.2 | 2,600 | 3,200 | Solution viscosity, .6 cp. |
| 2 | 15 | .1% NaOH | 1.7 | 2,700 | 3,300 | pH 11.2. |
| 5 | 15 | .1% NaOH | 1.4 | 4,200 | 4,800 | pH 11.25. |
| 10 | 15 | | 1.1 | 4,800 | 5,400 | pH 11.25. |
| 15 | 15 | .1% HCl | .96 | 4,700 | 5,300 | pH 11.25. |
| 2 | 0 | | 1.7 | 1,800 | 2,850 | pH 11.0. |
| 5 | 0 | | 1.1 | 2,700 | 3,000 | pH 11.25. |
| 10 | 0 | | .65 | 2,700 | 3,200 | pH 11.6. |
| 20 | 0 | | .47 | 2,500 | 3,300 | pH 11.8. |

[1] All tests with diamond alkali Grade 40 sodium silicate Na₂O–SiO₂ ratio 1:3.22 g. SiO₂ per 100 cc. Grade 40=39.6.
*Specimens compacted in 3% NaCl. Other specimens compacted in distilled water.

In accordance with the present invention, the following are ways of using silicates to combat unstable shale formations:

1. As a low-solids drilling fluid for shale drilling such that said fluid maintains the hole close to gauge and filtration control agents are not required so that low viscosities and hence high drilling rates could be obtained.

2. As an additive to conventional muds to improve hole stability. The silicates are compatible with many filter loss control agents. Viscosity can be raised with additives such as shredded asbestos. This method differs from the earlier technique described by Garrison in Oil Weekly, Feb. 6, 1939 advantages of which the major ones are summarized as follows:

Fresh water system—Easier to maintain; can run fresh water logs; do not need to circulate reserve pit.

Brine water system—Better shale protection; can provide clear fluid at pump suction.

The optimum salt content should be between 5 and 10 percent.

Table 5 provides a ranked comparison of fresh and brine water sodium silicate systems and a fresh water potassium silicate system.

TABLE 5.—COMPARISON OF SILICATE MUD SYSTEMS [1]

| Item | Sodium silicate—fresh water | | Potassium silicate—fresh water | | Sodium silicate—brine water | |
|---|---|---|---|---|---|---|
| | Rank | Comments | Rank | Comments | Rank | Comments |
| Silicate ratio (percent v.) | | 5–10% | | 2–3% | | 5–10%. |
| Salt content (percent w.) | | 0 | | 0 | | 3–8%. |
| Surface pits | 1½ | Use steel pits | 1½ | | 3 | Need to circulate reserve due to flocculated sediment. |
| Surface equipment | 1 | One 200 bbl. silicate tank | 2 | Heated silicate tank? | 3 | Premix tank desirable. |
| Desilter | 2½ | | 2½ | | 1 | Not required. |
| Clear water at suction | 2½ | Depends upon efficiency of desilter and pit arrangement. | 2½ | | 1 | Should get good settling in reserve pit. |
| Drilling rate | 3 | | 2 | Lower density and viscosity than sodium system. | 1 | Clear water drills fast, but salt increases hydrostatic head. |

TABLE 5.—COMPARISON OF SILICATE MUD SYSTEMS [1]—Continued

| Item | Sodium silicate—fresh water | | Potassium silicate—fresh water | | Sodium silicate—brine water | |
|---|---|---|---|---|---|---|
| | Rank | Comments | Rank | Comments | Rank | Comments |
| Seepage control | 1 | Solids help control loss | 2 | Solids help | 3 | Clear water losses high—may need Cypan. |
| Contaminant resistance | 1 | | 2 | | 3 | Most sensitive to $Ca^{++}$, etc. |
| Relative consumption | 1 | | 3 | $SiO_2$ p.p.b. may go down at same rate as other systems. | 2 | Higher losses from contaminants. |
| Ease of maintenance | 1 | Merely add one bbl. silicate for each ten bbl. makeup water. | 2 | Difficult to add small amounts uniformly. | 3 | Need to premix salt water. |
| Initial cost | 1 | 2 cents/lb. FOB location | 2 | 8 cents/lb. FOB location | 3 | Need sacked salt or "soft" brine. |
| Daily maintenance cost | 1 | Low unit cost | 3 | Possible equal consumption rate. | 2 | Need sacked salt. |
| Fresh water logs | 2 | $R_{ot}=0.6$ ohm-M at 76° F | 1 | $R_{ot}=1.5$ ohm-M at 76° F | 3 | Must use salt water logs. |
| Flexibility to mud up | 2 | | 1 | Compatible with standard additives. | 3 | Salt water mud—not compatible with all additives. |
| Alkalinity control | 1½ | | 3 | Need KOH | 1½ | |

[1] Rank No. is relative desirability of the systems; one is best and three is worst.

PRECIPITATION OF $SiO_2$ BY CONTAMINANTS

Salts and acids encountered in the well may precipitate $SiO_2$. Table 6 lists qualitatively the effect of various contaminants. Several shales and clays are shown also. The contaminant loading of 8 pounds per barrel approximates that obtained in a typical drilling situation with 100 percent of the drilled formation being the given material. The short contact time (5 minutes in a high-speed blender) is compensated for by the relatively large surface area of the powdered materials.

TABLE 6.—CONTAMINATION TESTS

| Material* | $SiO_2$ remaining in solution**, (percent of original concentration) | | | |
|---|---|---|---|---|
| | >90 | 70-90 | 50-70 | <50 |
| Magnesium carbonate | | X | | |
| Calcium carbonate | X | | | |
| Calcium sulfate | | | | X |
| Sodium sulfate | X | | | |
| Calcium chloride | | | | X |
| Calcium hydroxide | | | | X |
| Dry cement powder | | | | X |
| Green cement | | | | X |
| Cured cement | | | | X |
| Sodium dichromate | | | | X |
| Potassium dichromate | | | | X |
| Kaolinite | X | | | |
| Atoka shale | X | | | |
| Offshore Texas shale | | | X | |
| Offshore Louisiana shale | | | X | |
| Bentonite | | | X | |
| Attapulgite clay | | | X | |
| Texas bentonite | | | X | |

*Contaminant loading=8 lb. per barrel.
**Base mud=10 percent Grade 40 sodium silicate in 10 percent NaCl brine.

Soluble divalent ions, such as the calcium in anhydrite or cement, are especially detrimental because it has been found that:

1. Soluble calcium will cause $SiO_2$ losses far in excess of those attributable solely to formation of $CaSiO_3$ on a stoichiometric bases;

2. Sodium silicate solutions will tolerate NaCl concentrations of up to 10 percent with little loss of $SiO_2$. But more-saline brines will cause $SiO_2$ precipitation reaching 70 percent (of original $SiO_2$ in solution) for saturated makeup water. Precipitation as a floc will occur immediately upon contact;

3. Acids will tend to gel silicate solutions but the gelation does not necessarily occur immediately upon mixing. Rather, gelation time decreases logarithmically with increasing acid concentration over the range studied; and 4. Silicate-brine water systems are generally in a state of incipient precipitation and are more severely affected by contaminants.

SEEPAGE LOSSES TO PERMEABLE FORMATIONS

The basic silicate systems as formulated by the present invention have essentially no filter loss control. This is in line with the fundamental approach of obtaining shale stabilization through electrochemical properties of the filtrate rather than through low fluid loss. However, the lack of filtrate control may lead to high seepage losses if highly permeable formations are penetrated.

Dynamic filtration tests as shown in Table 7, show remarkably low filtration rates for silicate muds containing a small amount of drilled solids.

The addition of sodium silicate to these low solids muds reduced the dynamic filter loss by a much greater extent than could be accounted for by the slight increase in the filtrate viscosity. Presumably the silica is deposited in the filter cake, thereby lowering its permeability. The addition of small amounts of Cypan to a silicate mud containing drilled solids also was effective.

TABLE 7.—DYNAMIC FILTRATION TESTS WITH SUSPENSIONS OF SHALE IN SILICATE SOLUTIONS

| Test fluid | Spurt (cc./cm.²) | Filter rate in cc./cm.²/min. ×10³, at mud velocity, 3 ft./sec. at— | |
|---|---|---|---|
| | | 75° F. | 160° F. |
| Filtered against 30 Darcy sand pack: | | | |
| Distilled water, calc. | | 210,000 | |
| 2% Wapiabi shale in distilled water | 13 | 4,600 | |
| 2% Wapiabi shale in 10% Grade 40 (1:3.2) plus 6% NaCl plus ¾ lb./bbl. Cypan | 5 | 65 | |
| 20% Midway shale in 10% Grade 40 (1:3.2) | 14 | 14 | 40 |
| Filtered against 1.5 Darcy sandstone: | | | |
| Distilled water, calc. | | 10,500 | |
| 2% Wapiabi shale in distilled water | 5 | 1,170 | |
| 2% Wapiabi shale in 10% Grade 40 (1:3.2) plus 6% NaCl | 2 | 49 | 306 |
| 10% Grade 40 (1:3.2) plus ⅓ p.p.b. Na polyacrylate (Cypan-Ames Cyanamide Co.) | 1 | 12 | |
| 10% Grade 40 (1:3.2) plus ⅔ p.p.b. Na polyacrylate (Cypan-Ames Cyanamide Co.) | 0.3 | 5 | 13 |
| 5% Midway shale in 10% Grade 40 (1:3.2) plus 6% NaCl | {2.1 / 8} | {8 / 200} | {12 / 600} |
| 20% Midway shale in distilled water | 0.2 | 40 | 80 |
| 20% Midway shale in 2% 40° Bé. Pot. Sil. (1:2.1) plus ⅔ p.p.b. Dextrid | {0.14 / 0.02} | {40 / 18} | {78 / 40} |
| 20% Midway shale in 10% Grade 40 (1:3.2) | 0.3 | 6.6 | 16 |
| 10% Mitchell in 5% Grade 40 (1:3.2) | 0.5 | 9 | 10 |

NOTE.—Coarse solids were settled out before test.

The "spurt" measured in the dynamic filtration test is an indication of the effect which the fluids might be expected to have on penetration rate in permeable rocks. The spurt listed on Table 7 appears to depend upon the concentration of solids and not to be noticeably influenced by the amount of silicate present. Thus, it is shown that the silicate muds can be fast drilling fluids provided that a low solids content is maintained.

The triaxial shale tester is a test machine which takes into consideration a large number of variable which may influence hole stability; such as, the nature of the formation, the properties of the drilling fluid, the intergranular stresses, the fluid pressures and flow rates, and interaction between the filtrate and the formation. The triaxial shale tester simulates these factors so that any can be studied relative to hole stability.

The machine contains cylindrical shale specimens 2 inches OD, 1 inch high which are placed in a rubber jacket. Isotropic loading may be obtained by applying approximately equal vertical and radial pressures simultaneously, or the two pressures may be applied independently. Maximum load is 8,400 p.s.i. intergranular stress on the surface of the specimen. Fluids can be circulated through a hole drilled axially at pressures up to 500 p.s.i. Pore pressure relief at the periphery of the specimen permits filtrate to permeate through the specimen.

Different types of shale specimens can be used in the machine—natural cores and specimens reconstituted by compacting drill cuttings or shale fragments in the compaction cell. If specimens of soft shales are required, the appropriate cuttings or clay slurries are compacted at a pressure corresponding to the overburden pressure at the depth of the formation under study until the equilibrium water content is reached. Specimens simulating hard shale with bonded fractures are made by compressing hard shale fragments in 3 percent NaCl solution at 8,400 p.s.i.

I claim as my invention:

1. An improved method for stabilizing a hard shaly earth formation comprising treating said formation with a dilute aqueous liquid solution of less than about 20 percent by weight of alkali metal silicate of which from about 2 to about 6 percent by weight is dissolved $SiO_2$ and having a pH between 11 and 12 and a solution viscosity of less than 2 centipoise, said solution being maintained in contact with said formation at a pressure exceeding the fluid pressure within the earth formation.

2. The method of claim 1 wherein the solution contains between 5 and 15 percent of sodium silicate 40 Be' solution, the ratio of $Na_2O:SiO_2$ being between 1:3 to 1:4 respectively, and the pH of the solution being between 11.1 and 11.4.

3. The method of claim 2 wherein the base of the solution is water.

4. The method of claim 3 wherein the water contains NaCl

5. The method of claim 3 wherein the water contains a mixture of NaCl and NaOH.

6. The method of claim 3 wherein the water contains a mixture of NaCl and an alkali metal carbonate.

7. The method of claim 2 wherein the base of the solution is brine.

8. An improved method of stabilizing a hard shaly earth formation being drilled comprising:
   a. preparing a drilling fluid of an aqueous solution of 5–15 percent by weight of sodium silicate having a ratio of $Na_2O:SiO_2$ of 1:3 to 1:4, respectively, having a viscosity of less than 2 centipoise and a pH of 11.1–11.4 and;
   b. injecting drilling solution (a) via a drill hole into a hard shaly earth formation while maintaining the pressure on the solution in excess of that within the earth formation so that the solution penetrates into and coats with siliceous coating the interstices in the formation and thereby effects a stabilization and resistance to water damage.

9. The method of claim 8 wherein the aqueous solution contains a small amount of NaCl.

10. The method of claim 8 wherein the aqueous solution contains a small amount of acid.

* * * * *